United States Patent
Faltyn et al.

(10) Patent No.: US 10,484,501 B2
(45) Date of Patent: Nov. 19, 2019

(54) INTELLIGENT SUBSCRIBER PROFILE CONTROL AND MANAGEMENT

(71) Applicant: Broadsource Group Pty Ltd, Docklands (AU)

(72) Inventors: Haydn Faltyn, Melbourne (AU); Michael Gliana, Melbourne (AU)

(73) Assignee: Broadsource Group Pty Ltd, Docklands (AU)

( * ) Notice: Subject to any disclaimer, the term of this patent is extended or adjusted under 35 U.S.C. 154(b) by 185 days.

(21) Appl. No.: 15/688,665

(22) Filed: Aug. 28, 2017

(65) Prior Publication Data

US 2018/0077260 A1 Mar. 15, 2018

Related U.S. Application Data

(63) Continuation-in-part of application No. 15/178,572, filed on Jun. 10, 2016.

(60) Provisional application No. 62/245,965, filed on Oct. 23, 2015.

(51) Int. Cl.
*H04M 3/42* (2006.01)
*H04L 29/08* (2006.01)
*H04M 1/725* (2006.01)

(52) U.S. Cl.
CPC ...... *H04L 67/306* (2013.01); *H04M 1/72563* (2013.01); *H04M 1/72566* (2013.01); *H04M 1/72569* (2013.01); *H04M 1/72572* (2013.01); *H04M 3/42238* (2013.01); *H04M 3/42323* (2013.01); *H04M 1/72577* (2013.01)

(58) Field of Classification Search
CPC .................. H04M 3/436; H04M 3/42059
USPC ...................... 379/201.01–201.02
See application file for complete search history.

(56) References Cited

U.S. PATENT DOCUMENTS

| | | |
|---|---|---|
| 8,126,439 B1 | 2/2012 | Sankaranaraynan et al. |
| 2004/0259536 A1 | 12/2004 | Keskar et al. |
| 2005/0210417 A1* | 9/2005 | Marvit .................. G06F 1/1613 715/863 |
| 2010/0281427 A1* | 11/2010 | Ghosh ................. G06F 21/6263 715/811 |
| 2014/0235203 A1 | 8/2014 | Gonsalves et al. |
| 2014/0302835 A1* | 10/2014 | Henderson ........ H04M 1/72563 455/418 |

* cited by examiner

*Primary Examiner* — Rasha S Al Aubaidi
(74) *Attorney, Agent, or Firm* — Brian R. Galvin; Galvin Patent Law LLC

(57) ABSTRACT

A system for dynamic profile and persona management, comprising a profile and persona management server that receives device event information from a user device, and compares the event information to a feature bundle, the feature bundle corresponding to a set of feature configurations, and directs the operation of connected user services of a telephony control system, whether for the user device, for another subscribed user device, or in the cloud, based on the feature configurations. The system also comprises a database for storing feature configurations, feature configuration bundles and feature policies made up of multiple feature bundles.

20 Claims, 15 Drawing Sheets

| License | |
|---|---|
| License Info | > |
| Capabilities | |
| Rules | RWX |
| Profiles | R-X |
| Events | RWX |
| Features | R-X> |
| Server | |
| Server settings | > |
| Import and export settings | > |

| | X | | | | | | | | |
|---|---|---|---|---|---|---|---|---|---|
| Location | | | | | | | | | |
| Scheduler | | | | | | | | | |
| Calendar | | | | | | | | | |
| Sensor | | | | | | | | | |
| Connectivity | | | | | | | | | |
| Manual Activation | | | | | | | | | |

INTELLIGENT SUBSCRIBER PROFILE CONTROL AND MANAGEMENT

CROSS-REFERENCE TO RELATED APPLICATIONS

This application is a continuation-in-part of U.S. patent application Ser. No. 15/178,572, titled "INTELLIGENT SUBSCRIBER PROFILE CONTROL AND MANAGEMENT" filed on Jun. 10, 2016, which claims benefit of, and priority to, U.S. provisional patent application No. 62/245,965, titled "INTELLIGENT SUBSCRIBER PROFILE CONTROL/MANAGEMENT" and filed on Oct. 23, 2015, the entire specifications of each of which are incorporated herein by reference in their entirety.

BACKGROUND OF THE INVENTION

Field of the Art

The disclosure relates to the field of business communication, and more particularly to the field of managing call profiles and subscriber personas on, and related behavior of, a telephone control system or private branch exchange.

Discussion of the State of the Art

In business communication, it has been common for a business to operate a telephony private branch exchange (PBX) or other telephony control system to manage call routing and switching for their organization. Recently, services that provide similar and in some cases enhanced features or capabilities and which use different underlying technologies such as hosted or cloud PBX and unified communications platform (UC) which may also be hosted or cloud service, have entered the market and are now in general use as alternatives to traditional PBX. Generally, PBX, and hosted or cloud PBX or UC service providers offer a variety of features and capabilities with their product, and an organization selects the subscription service that best suits their needs and configures the specific features they intend to use most. Currently, when a new feature or alternate configuration is needed, someone must manually reconfigure operation to prevent gaps in service—for example, setting a call-forwarding rule to "active" when they leave the office. Additionally, employees are increasingly becoming more mobile, working from a mobile phone instead of a desk phone, which requires more flexible behavior handling to accommodate frequent changes in location or availability. Subscribers using these telephony control systems now have complex features and functions available to them that span: a physical desk phone, a computer based softphone, a tablet based softphone, a mobile phone and a mobile based softphone, depending on their location and context. The divergence of services onto these devices, whether personally or business owned, means increased complexity and a blurring of subscribers' business and personal time.

What is needed is a system for intelligent telephony system profile control that enables adaptive PBX, hosted or cloud PBX or hosted or cloud UC behavior with existing products, while enabling profile and persona management from a mobile device, thus allowing telephony control systems to adapt to subscribers and to improve their operation without necessarily requiring explicit user intervention.

SUMMARY OF THE INVENTION

Accordingly, the inventor has conceived and reduced to practice, in a preferred embodiment of the invention, a system and methods for intelligent call system profile and persona control, that integrates with mobile devices to automatically, in real time and near real time, intelligently modify configuration of the telephony control system based on subscriber context and actions.

According to a preferred aspect, a system for dynamic profile and persona management across a plurality of user services, comprising: a profile and persona management application comprising at least a plurality of programming instructions stored in a memory and operating on a processor of a network-connected mobile computing telephony device and configured to: receive at least a plurality of device event information from a user device, and configured to compare at least a portion of the event information to a plurality of feature bundles, the feature bundles each corresponding to at least a plurality of feature configurations; direct the operation of user services by activating, modifying, or deactivating one or more user services related features of a telephony control system, the user services related features corresponding to at least a second user device and the operation being directed based at least in part on the feature configurations; and retrieve from a mobile telephony control data store at least a plurality of programming instructions specifying new feature bundles based functionality to be employed upon capture of novel device event information sets; and the mobile telephony control data store comprising at least a plurality of programming instructions stored in a memory and operating on a processor of a network-connected computing device and configured to store and provide at least a plurality of feature configurations and a plurality of corresponding feature bundles, wherein each feature bundle corresponds to at least subset of the stored feature configurations controlling at least one user service, is disclosed.

According to another preferred aspect, a method for dynamic profile and persona management, comprising the steps of: receiving, at a profile and persona management application comprising at least a plurality of programming instructions stored in a memory and operating on a processor of a network-connected mobile computing telephony device, a plurality of device event information; comparing at least a portion of the event information to at least a plurality of feature bundles stored in a database; retrieving from a network-connected telephony control system data store at least a plurality of programming instructions specifying new feature bundle-based functionality to be employed upon capture of novel device event information sets; creating at least one feature policy based upon at least one feature bundle; enacting, if a feature policy that matches the portion of the event information is found, a plurality of feature bundle directives based at least in part on the active feature configurations; modifying the state of at least one user service, based upon the performance of a predefined gesture with the mobile computing device, according to least one feature bundle directive retrieved from the network-connected telephony control system.

According to various aspects, a dynamic profile and persona management system may be integrated with an existing telephony system, and may be used to automatically control existing rules and policies as well as add a layer of adaptive behavior to further enhance function. Continuous input from mobile devices may be used to drive feature configuration and rule activation in real-time, in response to changes in device state such as location, physical orientation, date and time, proximity (in the context of proximity, "macro" generally referring to GPS and "micro" generally referring to beacon technologies) or connectivity (for example, forwarding calls to a VoIP number if the device is on a WiFi network, or forwarding to another contact or a message recorder if a device goes out of the coverage area). Telephony control system configuration may also be updated in response to user scheduling (for example, accessing a calendar or to-do list on a user's mobile device and using this information to change rules when the user is known to be unavailable). Rules may also be configured intelligently, preventing feature conflicts or errors in configuration on the telephony control system that may occur when changes are made manually, as well as speeding up deployment of new configuration by directly modifying rules and behavior without requiring navigation of a configuration interface (as would be needed when manually configuring settings).

Operation may be configured by individual users (for example, to configure privacy settings or to input specific contact details for use), or by an organization for large-scale deployment with consistent configuration across a user base. Operation may be always on, using mobile features such as geofencing to detect changes and react accordingly without user interaction and without needing to keep a particular software application running on their device (which may negatively impact user experience, for example draining battery). Exemplary uses for always-on profile and persona management may include automatically forwarding calls when a user leaves an office or other location, send calls to voicemail during sleeping hours, mute or forward calls during scheduled events such as meetings, forward calls to personal assistant when the physical orientation of the device changes, like flipping the device down on a table, selectively muting certain contacts or call types while allowing others to ring, or configuring emergency contact settings.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

FIG. 9B is an additional illustration of an exemplary panel of a possible profile and persona management user interface operating on a mobile device.

FIG. 9C is an additional illustration of an exemplary panel of a possible profile and persona management user interface operating on a mobile device.

DETAILED DESCRIPTION

Figure 1:
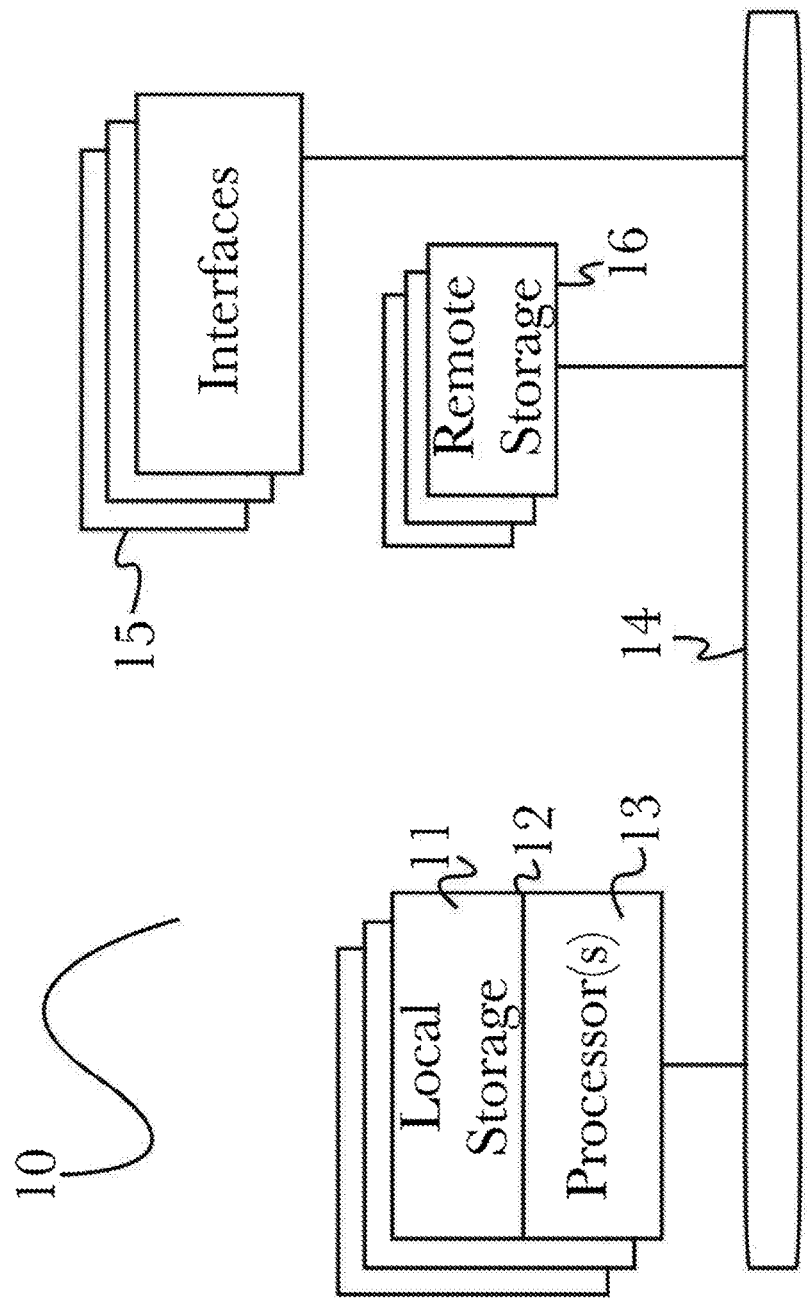
FIG. 1 is a block diagram illustrating an exemplary hardware architecture of a computing device used in an embodiment.

The inventor has conceived and reduced to practice, in a preferred embodiment of the invention, a system and methods for intelligent call system profile and persona control, that integrates with mobile devices to automatically, in real time and near real time, intelligently modify configuration of the telephony control system based on subscriber context and actions.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

Figure 5:
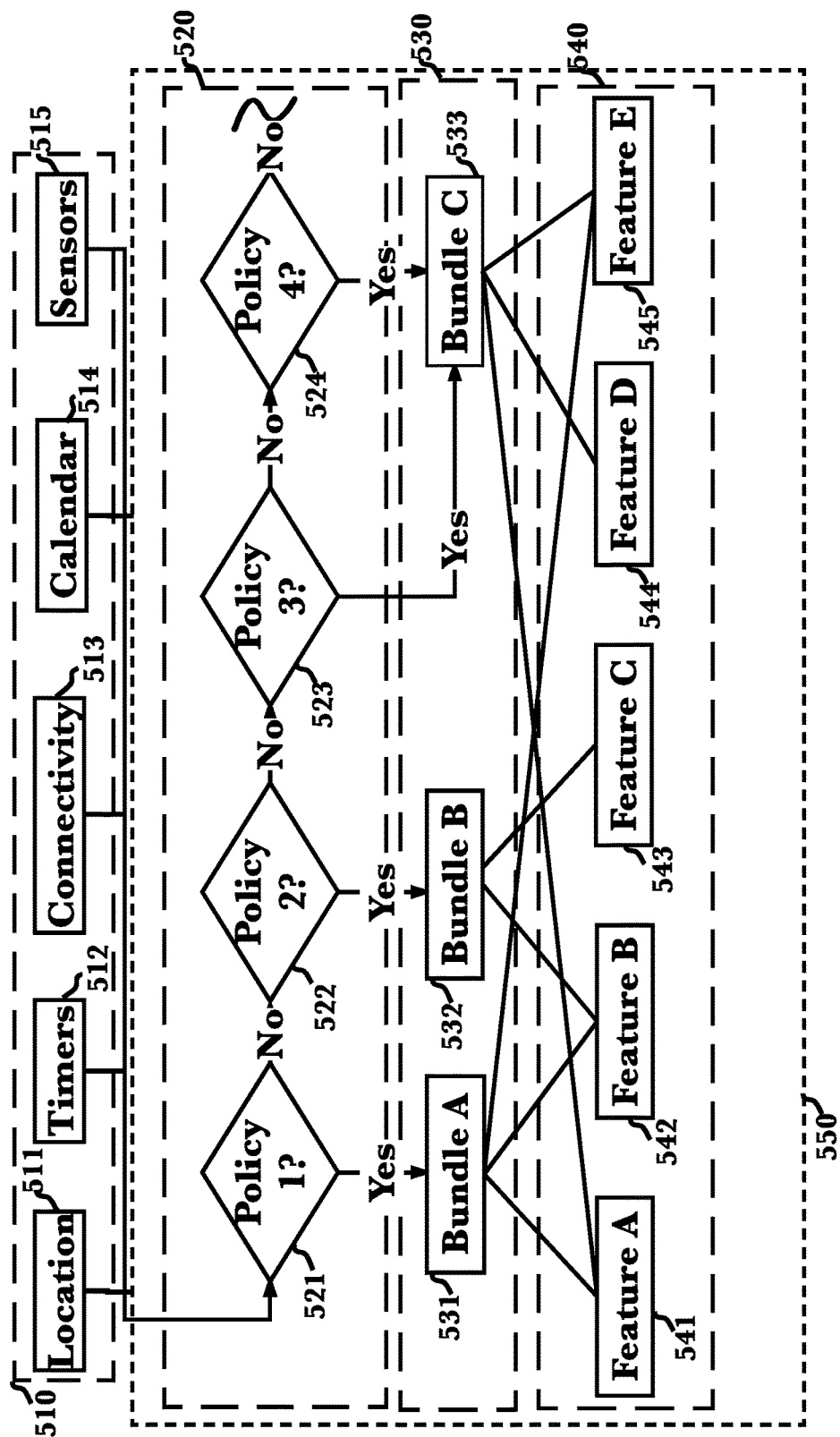
FIG. 5 is an overview of an exemplary system architecture for a profile and persona management server, according to a preferred embodiment.

FIG. 5 is an overview of an exemplary system architecture 500 for a profile and persona management server 550, according to a preferred embodiment of the invention. According to the embodiment, profile and persona management server 550 may operate on a user's mobile device (such as a smartphone), and may be integrated with a number of mobile systems 510 operating on a user's device, such as location sensors 511 (for example, a smartphone using GPS or network signal triangulation or BLUETOOTH™ beacons), clocks or timers 512, network connectivity information 513, calendar or other scheduling information 514, or hardware sensors 515 such as accelerometer or barometer devices that may be operating on a user's device. Mobile systems 510 may provide a variety of information that may be received and utilized by profile and persona management server 550 according to the embodiment as described below, and it should be appreciated that the quantity and type of information provided by mobile system 510 may vary. For example, additional sensor 515 types may be utilized if they are available, such as (for example, including but not limited to) heart rate, light, pressure, vibration, electrical current, EM radiation, or other sensor types.

Data received from various sources may then be compared to configured behavior policies 520, and when a policy match is found, rules bundle 530 corresponding to a selected policy (for example, a set of rules and configurations that drive behavior according to the particular policy, such as forwarding specific types of calls to a specific contact number based on device location data, modifying the function of a second person's mobile device such as, but not limited to forwarding all calls and setting the that device's status to "do not disturb" or placing a specific notification message on one of the user's social media pages) may be executed. Received data may be compared against configured policies according to an ordered list, checking against a first policy 521 to determine if the information is an appropriate match for the policy, and if not continuing on to additional policies 522-524, until a match is found or all known policies have been examined and no matches found. If a policy match is found, for example a fourth policy 524, a corresponding bundle 533 may be retrieved for execution. Various bundles 531, 532, 533 may correspond to particular sets of features 540, for example a bundle 531 comprising three features 541, 542, 545, or a second bundle comprising the same or a different set of features 542, 543. It should be appreciated that bundles may overlap and comprise similar or related features, for example as shown with bundle C 533, comprising features 541, 544, 545 that partially overlap with the features of bundle A 531. Features may comprise a variety of functions, rules, configuration parameters, or other operation instructions or values that may optionally be provided as bundled "recipes" to be used to direct the operation of the profile and persona management server 550 for profile and persona management behavior. Recipes may comprise any variety or combination of feature types, and may be created or modified by users or may simply be retrieved from a source such as an application store, and may be used "as-is" without further configuration. In this manner, providers may produce various feature recipes and publish them to make different feature types or combinations easily available to users with minimal configuration or technical knowledge required.

According to a preferred embodiment, profile and persona management server 550 may interact with an existing telephony control system (that is, a telephony control system currently deployed or in use may be directed by profile and persona management server 550, rather than requiring the setup of new hardware or reconfiguration of a telephony control system to facilitate integration) and may be used to automatically control existing rules and policies as well as add a layer of adaptive behavior, accomplished in the art with the use of machine learning or artificial intelligence or the like, to further enhance function. Continuous input from mobile devices may be used to drive feature configuration and rule activation in real-time, in response to changes in device state such as location 511, physical orientation, date and time, proximity between one or more devices or at least one device and a structural feature (for example setting phone to do not disturb upon entering a library within a school) and connectivity 513 (for example, forwarding calls to a VoIP number if the device is on a Wi-Fi network, or forwarding to a contact or a message recorder if a device goes out of the coverage area). Configuration may also be updated in response to user scheduling (for example, accessing a calendar or to-do list 514 on a user's mobile device and using this information to change rules when the user is known to be unavailable). Rules may also be configured intelligently, preventing feature conflicts or errors in configuration that may occur when changes are made manually, as well as speeding up deployment of new configuration by directly modifying rules and behavior without requiring navigation of a configuration interface (as would be needed when manually configuring settings).

Operation may be configured by individual users (for example, to configure privacy settings or to input specific contact details for use, described below referring to FIG. 9), or by an organization such as an enterprise or wireless provider for large-scale deployment with consistent configuration across a user base. Operation may be "always-on", using mobile features such as geofencing to detect changes and react accordingly without user interaction and without needing to keep a particular software application running on their device (which may negatively impact user experience, for example draining battery). Exemplary uses for always-on profile and persona management may include automatically forwarding calls when a user leaves an office or other location, sending calls to voicemail during sleeping hours based on a device clock or set timers 512, muting or forwarding calls during scheduled events such as meetings or when a user places their device face-down on a surface, forwarding calls to a local number when traveling internationally, selectively muting certain contacts or call types while allowing others to ring, or configuring emergency contact settings. Additional exemplary use cases are described below in greater detail, referring to FIG. 9.

Detailed Description of Exemplary Embodiments

Figure 6:
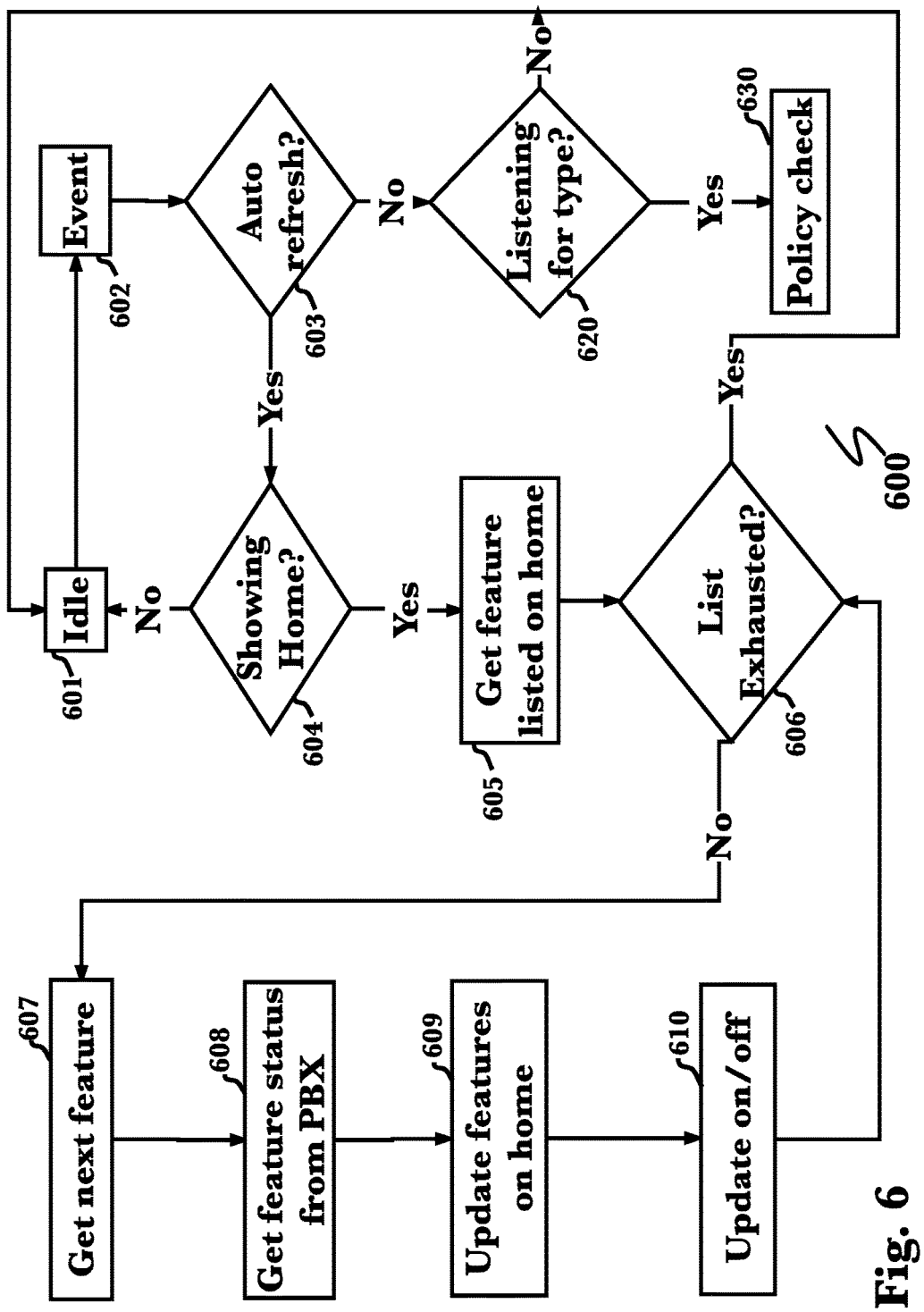
FIG. 6 is a flow diagram illustrating a process for profile and persona management event logic, according to a preferred embodiment.

FIG. 6 is a flow diagram illustrating a process 600 for profile and persona management event logic, according to a preferred embodiment of the invention. A profile and persona management server 550 may operate in an idle state while at step 601, listening for incoming events such as device sensor readings or location updates. When an event is received at step 602, it may be checked to see if it is an automatic refresh event at step 603. If the event is a refresh event type, then the server may check to determine whether a profile and persona management home screen is being presented at step 604 (for example, via a management interface as shown in FIG. 9). If a home screen is not being shown, then no refresh may be needed and operation may conclude with the server returning to an idle state, step 601. It should be appreciated that this refers to the refresh and idle state of a screen being shown, and it may be possible for applications or resources to continue operating in the background while they are not shown on a screen (for example, for chat messaging applications that may continue listening for new messages and only present an on-screen indicator when a message is received). Moreover, an application according to the embodiment may run in the background on a mobile device while other applications are being used, such as email, word processing web browsing, and similar applications; in these situations, the application according to the embodiment may receive events such as phone orientation changes and react to them if a recipe is triggered by such an event. If a home screen is being shown, a feature list may be retrieved at step 605 and iterated through at step 606 to retrieve the next feature in the list at step 607, retrieve that feature's current status from a telephony control system at step 608 (such as a PBX), update the presented feature list on the home screen at step 609, and then update whether the current feature's state is on or off at step 610. Other aspects may perform the same functional steps without the need for a telephony control system, but may use a telephony control data store of standardized feature bundles and recipes for the phone in use and the desired resultant action (not drawn). This iteration continues until the feature list is exhausted, at which point operation concludes and the server returns to an idle state, step 601, to await any further events, for example changes to a telephony control system configuration or to a user's device data (such as a change in location or connectivity, for example switching from a Wi-Fi network to a cellular data network). If the event is not an automatic refresh event type, the event may be checked to see if it matches any event types the server is listening for at step 620. If the event received is of a type the application is currently listening for (for example, according to a previously-configured feature), processing for events ends and the event may be used to check for an appropriate policy at step 630 as described below (referring to FIG. 8).

Figure 7:
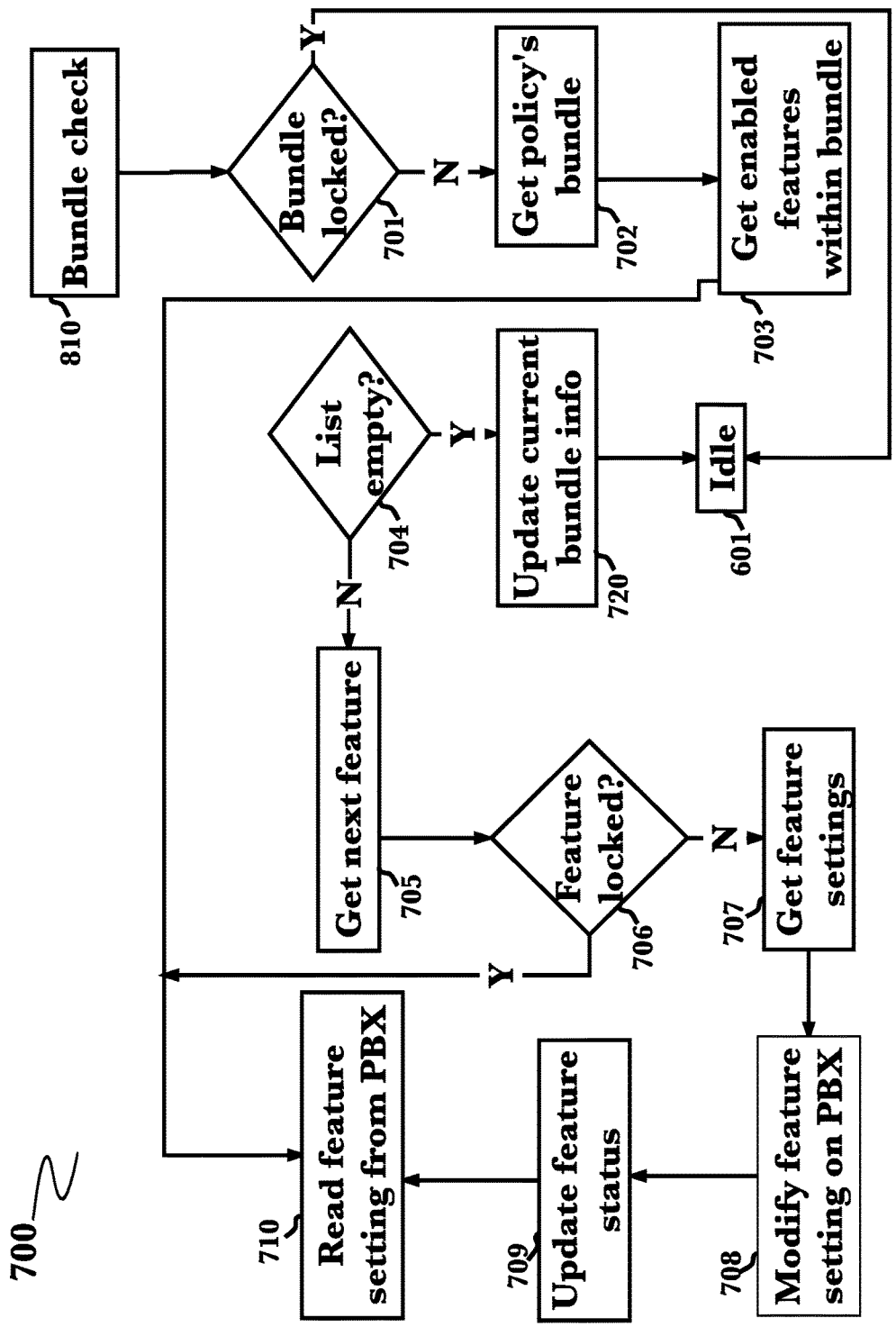
FIG. 7 is a flow diagram illustrating a process for profile and persona management bundle logic, according to a preferred embodiment.

FIG. 7 is a flow diagram illustrating a process 700 for profile and persona management bundle logic, according to a preferred embodiment. According to the embodiment, when a profile and persona management server 550 retrieves appropriate policy information, a bundle check at step 810 may be performed to determine whether to execute a feature bundle, and if so, which one to select. Upon initiating a bundle check, server 550 may determine whether a bundle is "locked" in step 701, or blocked from execution (for example, features that have restricted access for certain users, or features that are not supported by a user's device or service subscription). If a bundle is locked, server 550 may return to an idle state, from step 601, and resume listening for incoming events. If the bundle is not locked, the associated policy may be retrieved in step 702 and checked for bundle information, retrieving a list of features included in the bundle in step 703 and then iterating over the list in step 704 to read, update, or modify features as needed until the feature list is exhausted. In a first iteration step 705, the next feature in the bundle's feature list may be retrieved. The feature is then examined to determine if it is locked in step 706, and, if so, operation loops back to examine whether the list has been exhausted in step 704 before continuing. If the feature is not locked, its corresponding settings are retrieved in step 707, and these may be used to modify any corresponding setting in a telephony control system in step 708. Upon modifying telephony control system settings, the feature's status may be updated in step 709 in a feature list (to reflect the new changes), for example by reading the new feature settings from the telephony control system in step 710 after modification (to ensure that the appropriate values or other information are known and presented in a feature list, rather than relying on preconfigured values that may not accurately reflect the state of a PBX after an update). When a bundle's feature list is empty (that is, all features have been iterated upon or processed), the bundle information may be updated in an application display in step 720 (for example, so that a user may check what their current operation mode is, or currently-enabled features), and server 550 may return to an idle state and resume listening for more events.

Figure 8:
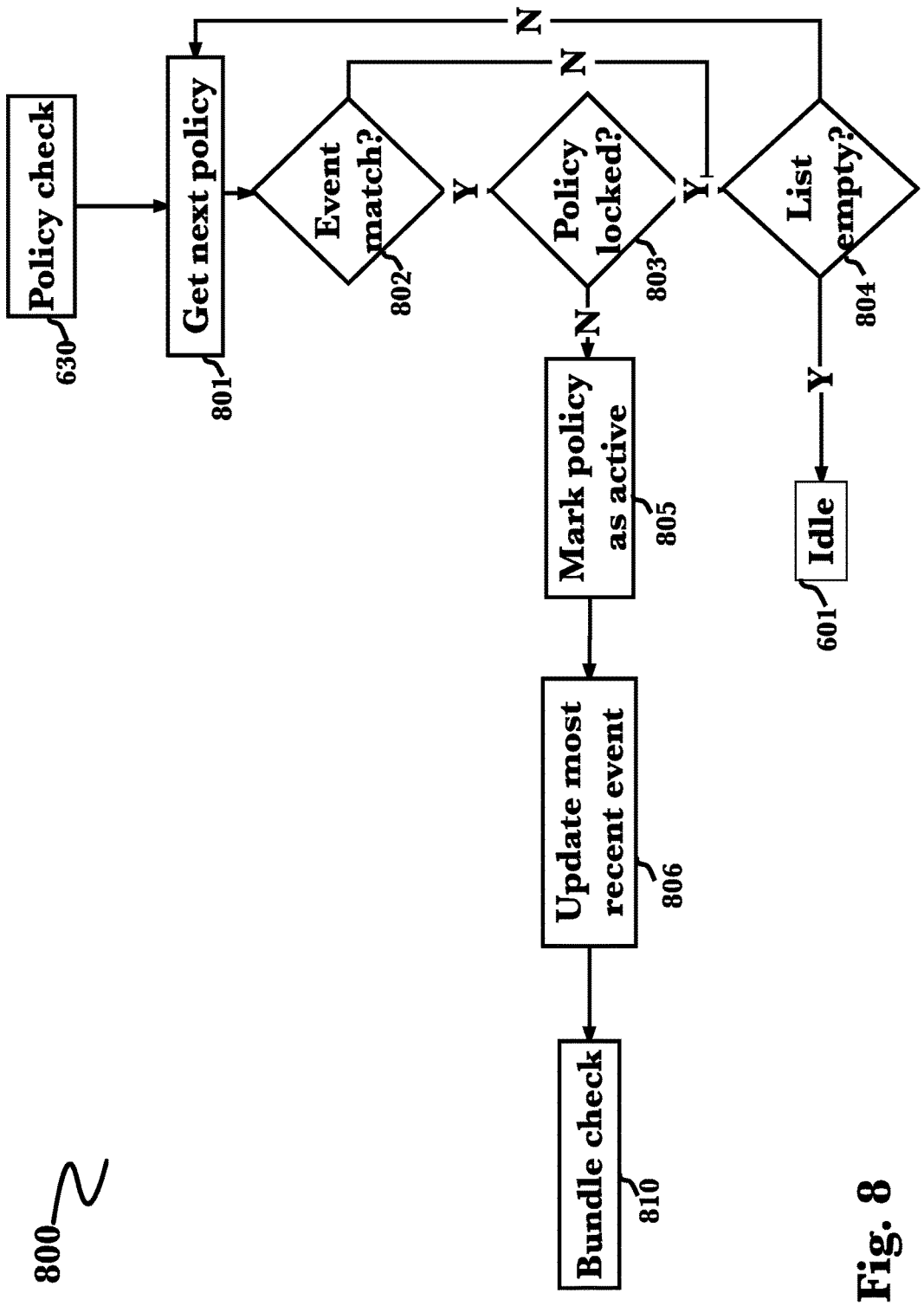
FIG. 8 is a flow diagram illustrating a process for profile and persona management policy logic, according to a preferred embodiment.

FIG. 8 is a flow diagram illustrating a process 800 for profile and persona management policy logic, according to a preferred embodiment. When an application receives a qualifying event (that is, an event for which the application was listening while in an idle state), it may begin a policy check in step 630 to examine available policies and determine if any match the received event. A profile and persona management server 550 may retrieve the next known policy in step 801 for examination, and compare the received event information to see if it matches the policy requirements in step 802. If an event match is not found, the list is checked for any additional policies in step 804. If the list is exhausted, the server may return to an idle state 601, otherwise the next policy may be retrieved in step 801 and operation continues. If an event match is found, the policy is checked to see if it is locked in step 803, and if so operation continues with examining the list for additional policies in step 804. If the policy is not locked, it may be marked as active in step 805 and event information may be updated to reflect the policy change in step 806. The server may then check for feature bundles in step 810 according to the activated policy, as described in FIG. 7.

Figure 9A:
FIG. 9A is an illustration of an exemplary panel of a possible profile and persona management user interface operating on a mobile device.

FIG. 9 is a diagram of an exemplary profile and persona management interface operating on a mobile device. FIG. 9A A user may view a list of available features and capabilities 901*a-n* optionally displayed with particular permissions such as read, write, or execute, referring to their ability to modify those features (for example, a user may be permitted to modify call forwarding settings but not their network access point name. FIG. 9B Specific features may be presented in a sorted or grouped listing 902*a-n* according to such configuration as telephony control system capabilities, user access privileges, specific device capabilities, or server-based rules and settings. FIG. 9C Users may configure various aspects of operation 903*a-n* such as preferences for location or schedule behavior, enabling a manual fine-tuning of their specific operation and capabilities.

For example, a user may choose to enable location and hardware sensor readings such as from an accelerometer or gyroscope operating on their device, and may configure rules to modify behavior based on physical orientation or movement of their device so they may modify profile and persona management settings through manipulation of the device. A particular example of this may be for a user to configure their device to automatically mute all incoming calls and forward to another number (such as their voicemail, for example) when they place the device face down on a surface, such as turning their phone over on a conference table during a meeting. Another example may be a user configuring operation such that placing their device in a pocket or bag will automatically update their availability status (for example, using a device's "do not disturb" settings or by setting call forwarding or calendar status) to indicate that they are "away", or unavailable. Another example may be configuration so that anytime a user is on a roaming network, their calls may be unconditionally forwarded to another phone number, such as one on a non-roaming carrier, to avoid unnecessary charges or plan usage. Another example may be a user configuring operation such that passing by a beacon (e.g Bluetooth beacon) within a specified range will automatically update their availability status (for example, instigating a feature bundle change to forward calls to a personal assistant as the user passes by the entrance to a meeting room, where the beacon is situated.

Figure 10:
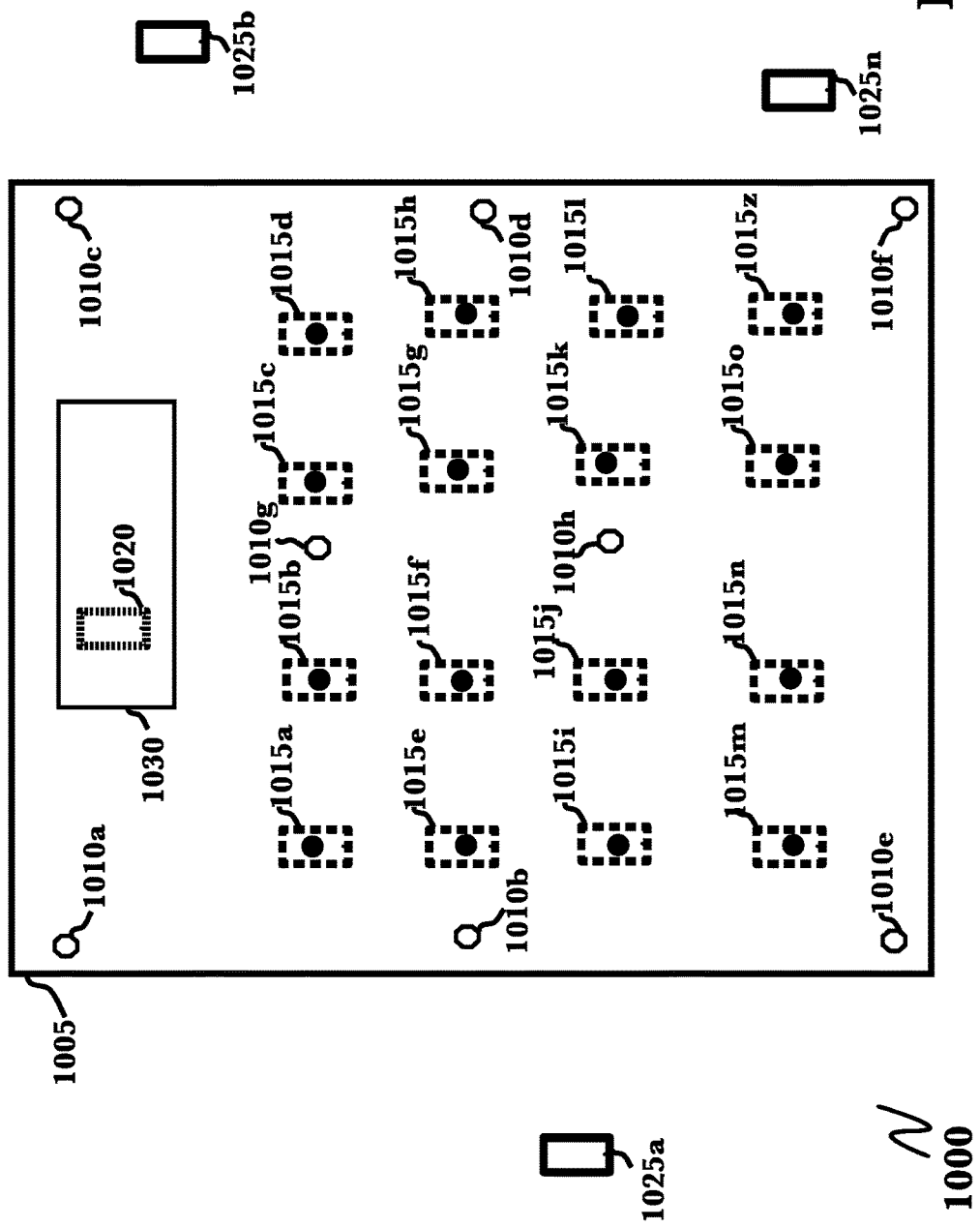
FIG. 10 is a simplified exemplary diagram of a use case where an embodiment is employed to prevent mobile device mediated distraction during business meetings, in classroom setting or in a movie auditorium.

Turning our attention to FIG. 10, an example embodiment usage employing above mentioned functions, may occur when a meeting is called where the presenter dictates that distractions are highly undesirable. An embodiment may make use of one or more proximity signal emitters such as BLUETOOTH™ beacons or moderate range near field communications transmitters 1010*a-n* within a meeting room 1005, possibly with further methods such as but not limited to radio wave absorbing or blocking paint or building materials to further reduce proximity system signal leakage outside of the room such that mobile devices outside the affected meeting room 1005 are not involved 1025*a-n*. Per embodiments, meeting attendees may be in the specified meeting rooms prior to the meeting. At any time prior to the meeting the meeting leader or mediator may arrive also using her mobile device. This leader or mediator may or may not verbally announce a time limit to allow attendees to close out of their mobile device mediated communications. When the meeting is to begin, the leader or mediator will place their mobile device, face down 1020 on any flat surface of varying type such as but not limited to a table, a shelf, or a desk to name just a few examples of the many usable surfaces known to those skilled in the art. All attendee's mobile devices, being subscribers to the same or similar PBX or UC services with the same of similar telephony control programming 1015*a-z* and all receiving the transmitted proximity signal locating them within the meeting room as part of a closed user group of meeting attendees. The event of the leader or mediator positioning her phone face down, as an example of one of the plurality of unique mobile device gestures known as useful in this situation to those skilled in the art, is parsed by the telephony control system and sent as an event corresponding to a policy (FIG. 5, 520) affecting one or more bundles (FIG. 5, 530) of user services related features of a telephony control system (FIG. 5, 540) by the profile and persona management server (FIG. 5, 550) on those phones, resulting in all of the mobile devices entering a specific state such as do not disturb, do not disturb with call forwarding, do not disturb with concomitant WiFi shutdown among other states that may prevent mobile devices from serving as a distraction to the meeting proceedings as per company or organizational meeting policy.

A second use for similar embodiments 1000 may be in an education setting where student use of mobile devices during classroom instruction may have become a significant disruption to the learning process. Briefly, students within embodiment associated proximity transmitter 1010*a-n* equipped classrooms 1005 may use their mobile devices 1015*a-z* as the teacher or professor, depending on the level, enters the room. When the educator is ready to start teaching, she may place her mobile device face down 1020 on a flat surface 1030, among other gestures unique and meaningful in this situation, at which time the teacher's mobile computing server sends actions to the telephony control system that controls the student's service and activates the proximity transmitters that have, until the educator's gesture, been dormant. More granular control is possible by adding more conditions, for example, the educator's calendar or schedule may be checked to see which class is currently in session, and only students enrolled in that class and in proximity of the classroom may have their devices triggered by the telephony control system. All the profile and persona management servers (FIG. 5, 550) running on mobile devices parse the proximity signal activation as a policy attached event (FIG. 5, 520) and feature bundles (FIG. 5, 530) are activated on each such that all student mobile devices will enter do not disturb status, do not disturb status with certain other apps such as but not necessarily limited to those for social media, but allowing other apps, such as cloud note taking services and other cloud based education related apps deemed useful to the class to be used, or some other status according to institution policy until the instructor's mobile device orientation is changed, releasing all student mobile devices. Once again, mobile devices 1025a-n outside of embodiment equipped classrooms 1005 are not effected possibly due to proximity signal dampening measures known to those skilled in the art.

One may also easily envision the use of similar embodiments to curtail mobile device use in movie theater auditoria 1005 where the start of the feature film may invoke a signal causing all patron mobile devices 1015a-z to enter a do not disturb state and may cause all screens to blank black, while still allowing only emergency calling to be activated. Once again, the use of tightly contained proximity transmissions within the auditoria 1010a-n may minimize affecting the mobile devices 1025a-n of patrons passing outside.

Figure 11:
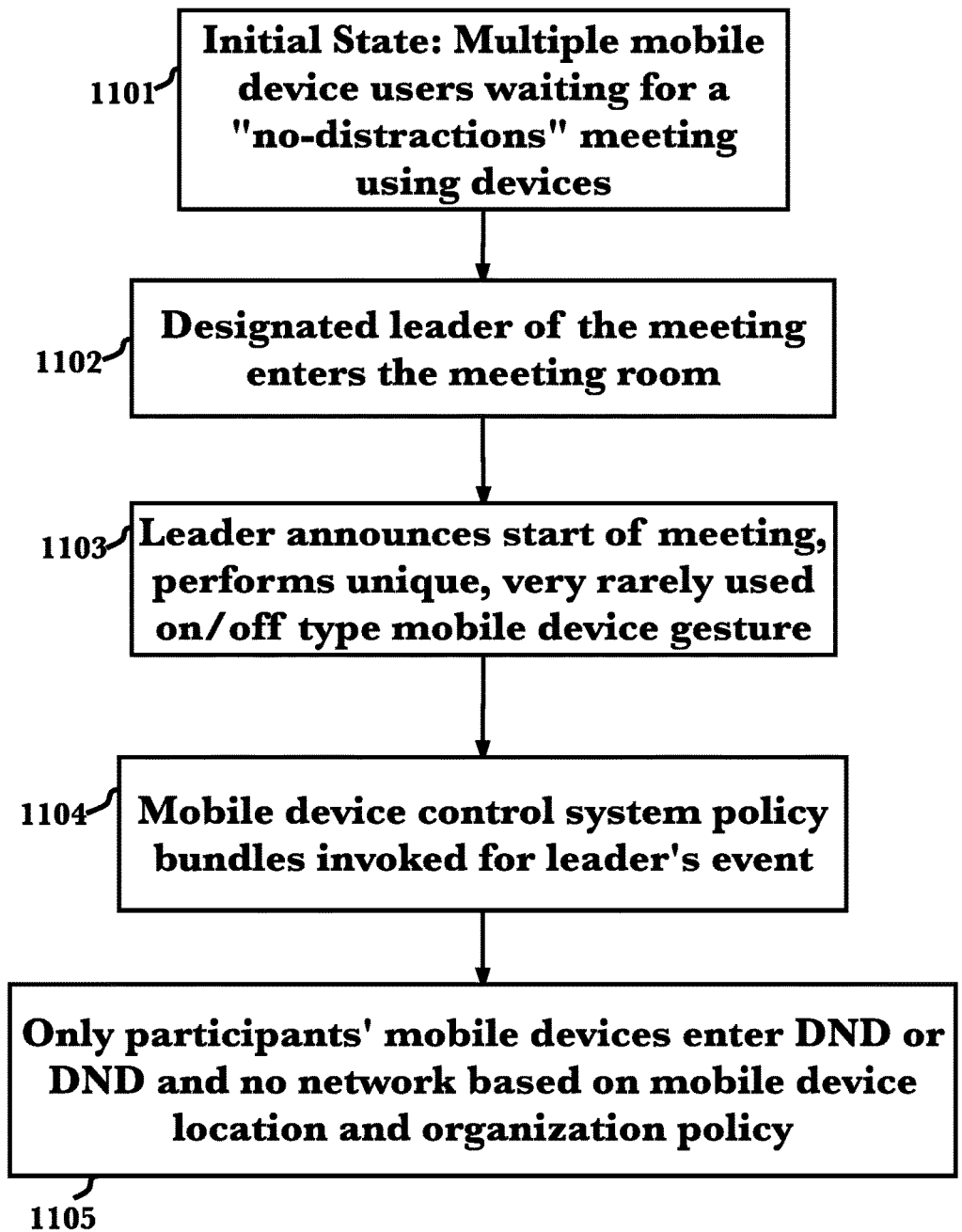
FIG. 11 is a flow diagram illustrating steps involved in preventing mobile device mediated distraction during business meetings in a classroom or at a movie.

FIG. 11 is a flow diagram illustrating steps involved in preventing mobile device mediated distraction during business meetings in a classroom or at a theater 1100. Initially, as participants are waiting for a meeting, class, or some entertainment showing where mobile device use is undesirable or prohibited to start, all mobile devices are functional at step 1101. Similarly, when the leader or mediator of the meeting, which may be an official of an organization, teacher, stage manager or projectionist first arrives and is still preparing for the presentation, mobile device use is unaffected at step 1102. However, at step 1103, when the time arrives for the meeting, class or theater show to begin, the organization official may perform a defining gesture such as but not limited to placing their mobile device face down on an available surface, starting a projector, activating a graphical implement on a master device or any other unique, rarely used on/off type action that may be meaningfully attached to a physical event known to those skilled in the art. At step 1104, the use of a proximity signal (FIG. 10, 1010a-n) specific to the venue (FIG. 10,1005) alerts mobile devices within the venue to their location and inclusion in a closed user group that is responsive to the meeting commencement event signal which invokes a pre-designed set of mobile device features controlled by the mobile device's profile and persona management server (FIG. 5, 550), which may differ depending on the manufacturer and model of the device. This results in the mobile devices within the venue entering at least a do not disturb state depending on the organization's policy at step 1105, but which may not affect those outside of the venue due to containment of the proximity field.

Figure 12:
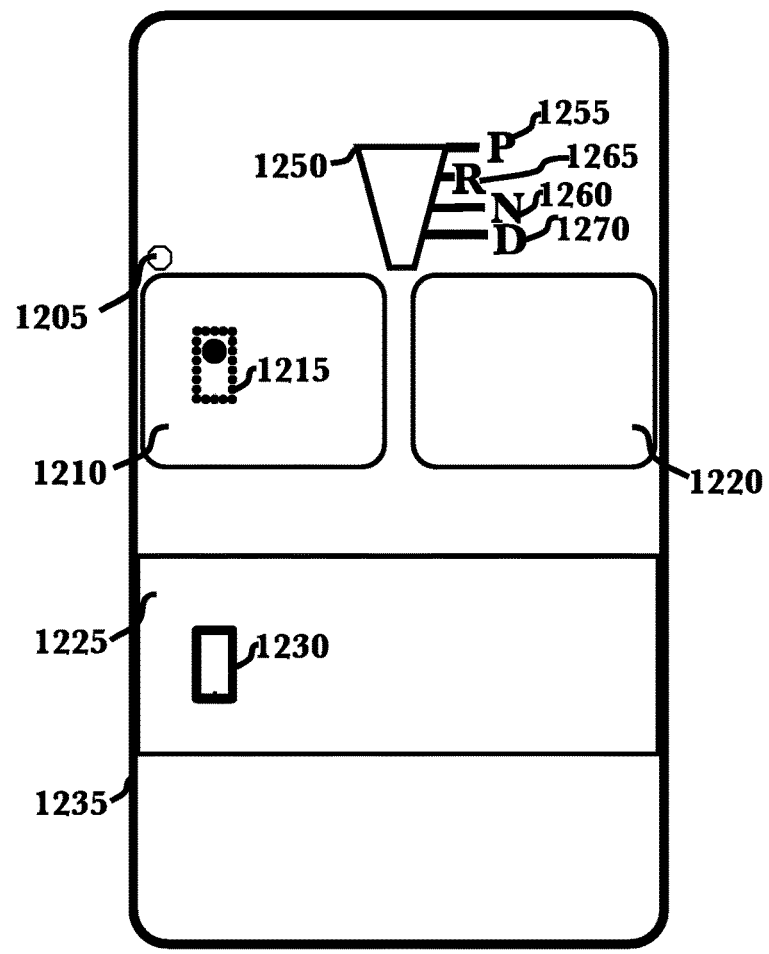
FIG. 12 is an illustration of embodiment use to change mobile device state as a safety measure during operation of a motor vehicle.

FIG. 12 is an illustration of embodiment use to change mobile device state as a safety measure during operation of a motor vehicle 1200. Of growing concern throughout the world is the use of mobile devices, particularly for texting and voice calls while driving a motorized vehicle 1235. Such behavior has been proven time and again to at least contribute to motor vehicle accidents by taking the attention of a driver away for tasks necessary for safe vehicle operation and transferring it to mobile device operation. Aspects may be used to curtail mobile device 1215 use by at least the driver of a motor vehicle 1210 with minimal effect on other vehicle occupants' mobile devices 1220, 1230 as per regulations. Here the use of a proximity transmission device such as a BLUETOOTH™ beacon of near field communications transmitter 1205 alerts a subscriber mobile device 1215 that it is in the close region of the driver's position 1210 of a running vehicle (presuming the transmitter would be activated by starting the vehicle's motor). Mobile device use by the "driver" of the vehicle would still be possible at this point. The profile and persona management server (FIG. 5, 550) policy event that may at least change the telephony control network settings for the driver's mobile device to "do not disturb", so the network will stop delivering calls or notifications from other social media type apps optionally based on governmental and possibly parental feature control (for example, some mobile network providers accommodate per-subscriber parental controls, which may be used to direct the operation of network-based features that in turn affect the subscriber's mobile device operation), may be activated by placing the transmission 1250 in any gear 1260, 1265, 1270 but Park (P) 1255. The driver's mobile device would maintain very limited functionality, for example short verbal exchanges with voice recognition agents such as SIRI™, CORTANA™ or ALEXA™, and receiving verbal directions. All other mobile device activities by a driver may require pulling over and placing the vehicle in park (or neutral with brake applied for standard transmission. Other occupants in the vehicle such as the front seat passenger 1220 and those in the back seat 1225 may still have full mobile device functionality, based on in-place government regulations and possible vehicle owner desire, however the proximity field would at least cause all devices within the vehicle to blank their screens should then enter the driver's area 1205 to prevent other passengers from distracting the driver with distracting visual information, reducing safety.

Another embodiment may make use of a driver's side proximity transmitter, GPS and coordinate mapping of public roads to curtail the use of mobile devices by the driver while in motion on those roads as an alternative to the example above, in fact an embodiment may use any detection and implementation method available to telephony systems known to those skilled in the art to perform this process.

Figure 13:
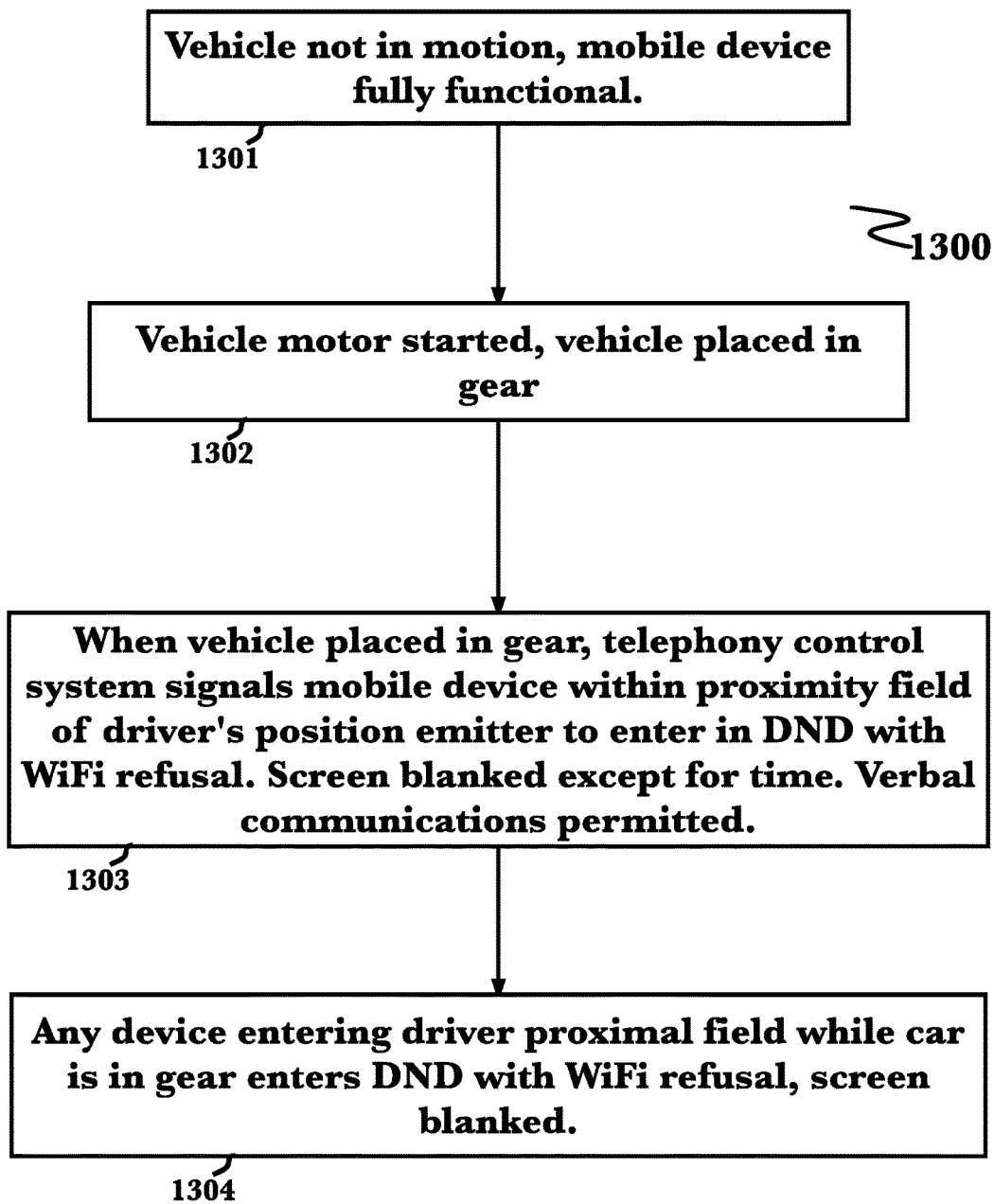
FIG. 13 is a flow diagram illustrating steps involved in changing mobile device state as a safety measure during operation of a motor vehicle.

FIG. 13 is a flow diagram illustrating steps involved in changing mobile device state as a safety measure during operation of a motor vehicle 1300. When the vehicle is not in motion, either with or without the engine running, all mobile devices are fully functional for all occupants of the vehicle at step 1301. According to one embodiment, at step 1302, when the vehicle's motor is running and the vehicle is placed into gear the telephony control system may signal the mobile device within a driver's side proximity field to enter at least a do not disturb state with the possibility of other functions and certain apps such as social media posting and chat app possibly also disabled by profile and persona management server of the device. At step 1303, it is possible that while the vehicle is in motion all WiFi and telephony data communications are disabled for the driver's phone with only emergency calling remaining active. Voice related direction providing apps and simple verbal question and answer delivery services such as SIRI™, CORTANA™ and ALEXA™ may also remain active depending on government regulations and car owner desire.

For added safety, at step 1304 provisions may be enabled for all passenger mobile devices, which remain functional during vehicle movement, to at least blank their screens when they enter the proximity field of the driver to prevent passenger implement distraction.

Another example may be a user configuring operation such that placing the user's device within a certain distance (immediate, near, far) (e.g Bluetooth beacon located on a telephone system handset (fixed phone) in a home office study) will automatically update different availability or feature bundle (for example, instigating a feature bundle change to the mobile persona to 'personal' when the user's device moves into the 'far' range within a home office environment, or changes the feature bundle to the mobile persona of 'work mode' when the user's device moves into the 'near' range, signifying the user has moved into their home office or when the user's device moves into the 'immediate' range, while they are talking on the device (placing the device within a few centimeters of the beacon), the feature bundle instigates an automatic 'move' of the telephone call to the telephone system handset.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity AN hardware interfaces) and, in some instances, volatile and/or non-volatile memory (e.g., RAM).

Although the system shown in FIG. 1 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
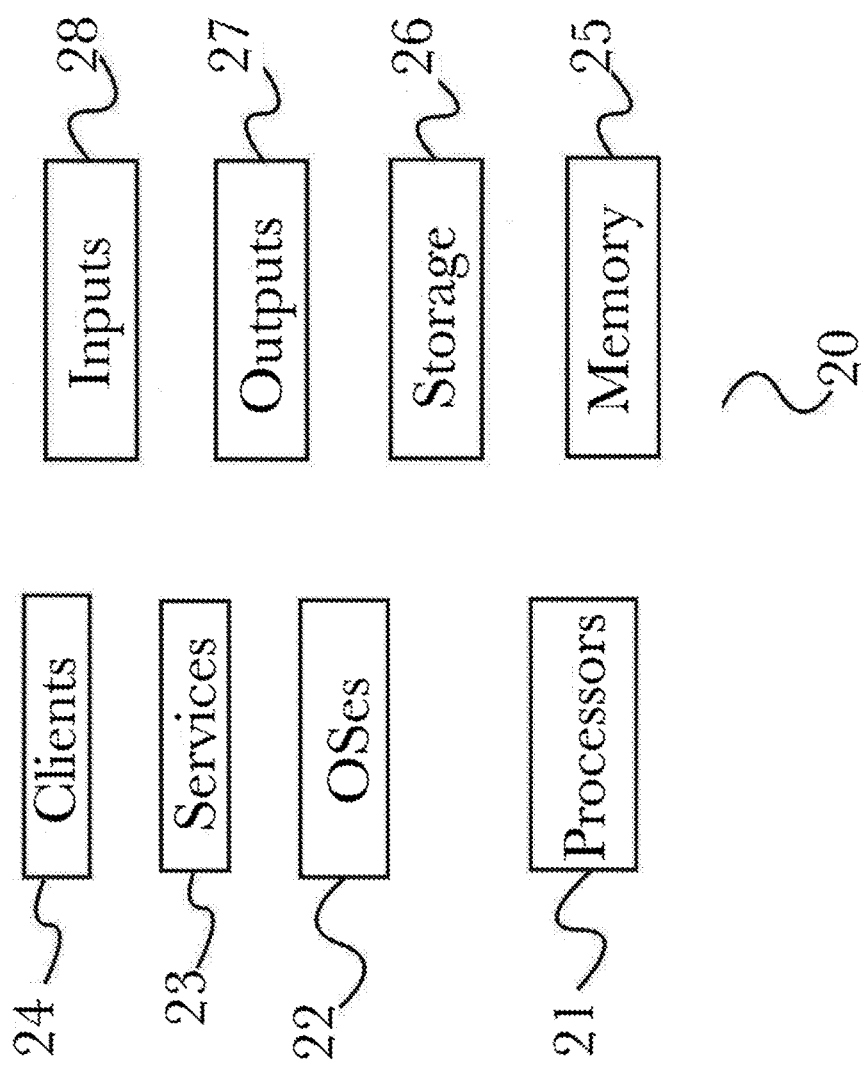
FIG. 2 is a block diagram illustrating an exemplary logical architecture for a client device, according to an embodiment.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 1). Examples of storage devices 26 include flash memory, magnetic hard drive, CD-ROM, and/or the like.

Figure 3:
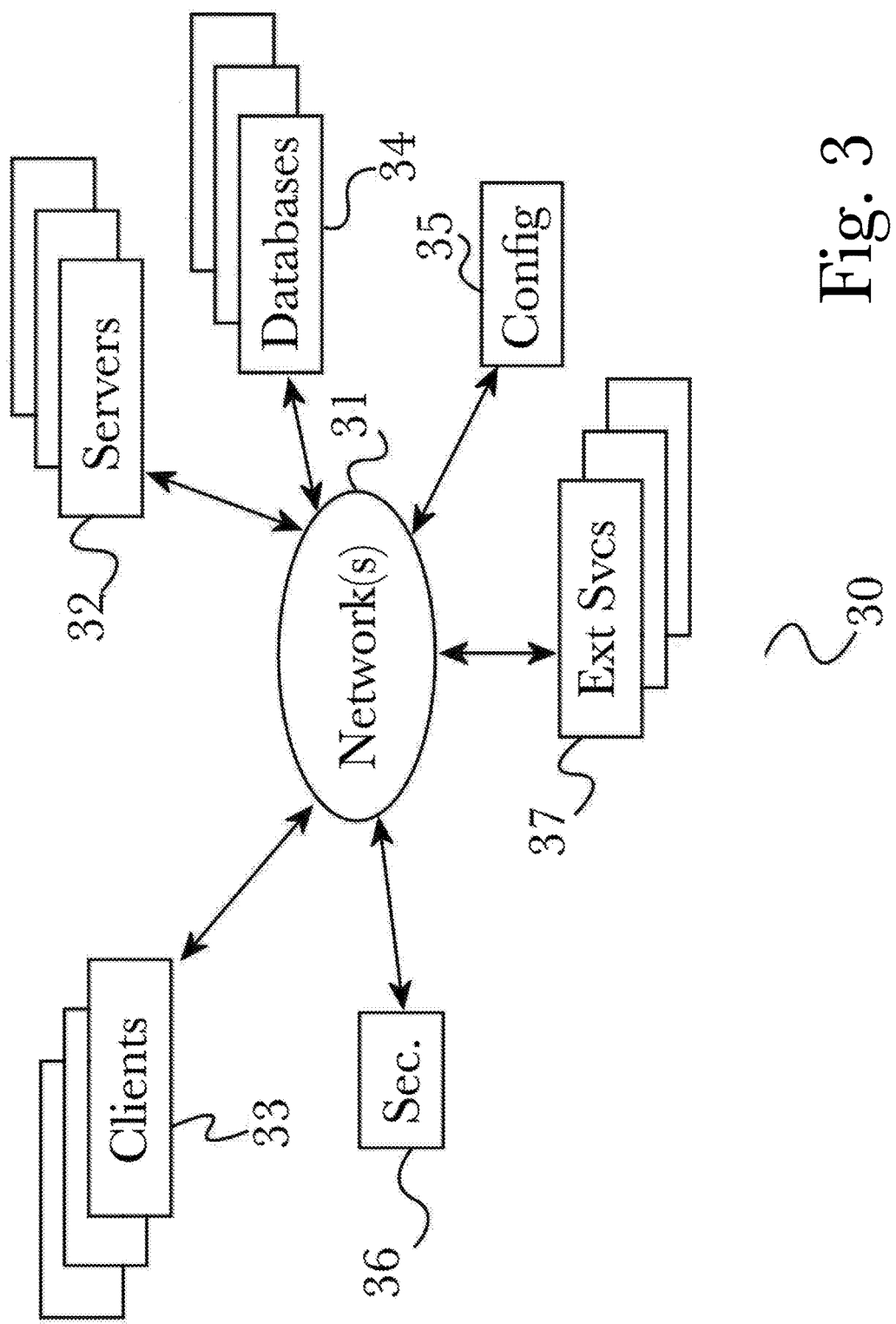
FIG. 3 is a block diagram showing an exemplary architectural arrangement of clients, servers, and external services, according to an embodiment.

In some embodiments, systems of the present invention may be implemented on a distributed computing network, such as one having any number of clients and/or servers. Referring now to FIG. 3, there is shown a block diagram depicting an exemplary architecture 30 for implementing at least a portion of a system according to an embodiment on a distributed computing network. According to the embodiment, any number of clients 33 may be provided. Each client 33 may run software for implementing client-side portions of the present invention; clients may comprise a system 20 such as that illustrated in FIG. 2. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments. clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific embodiment.

Figure 4:
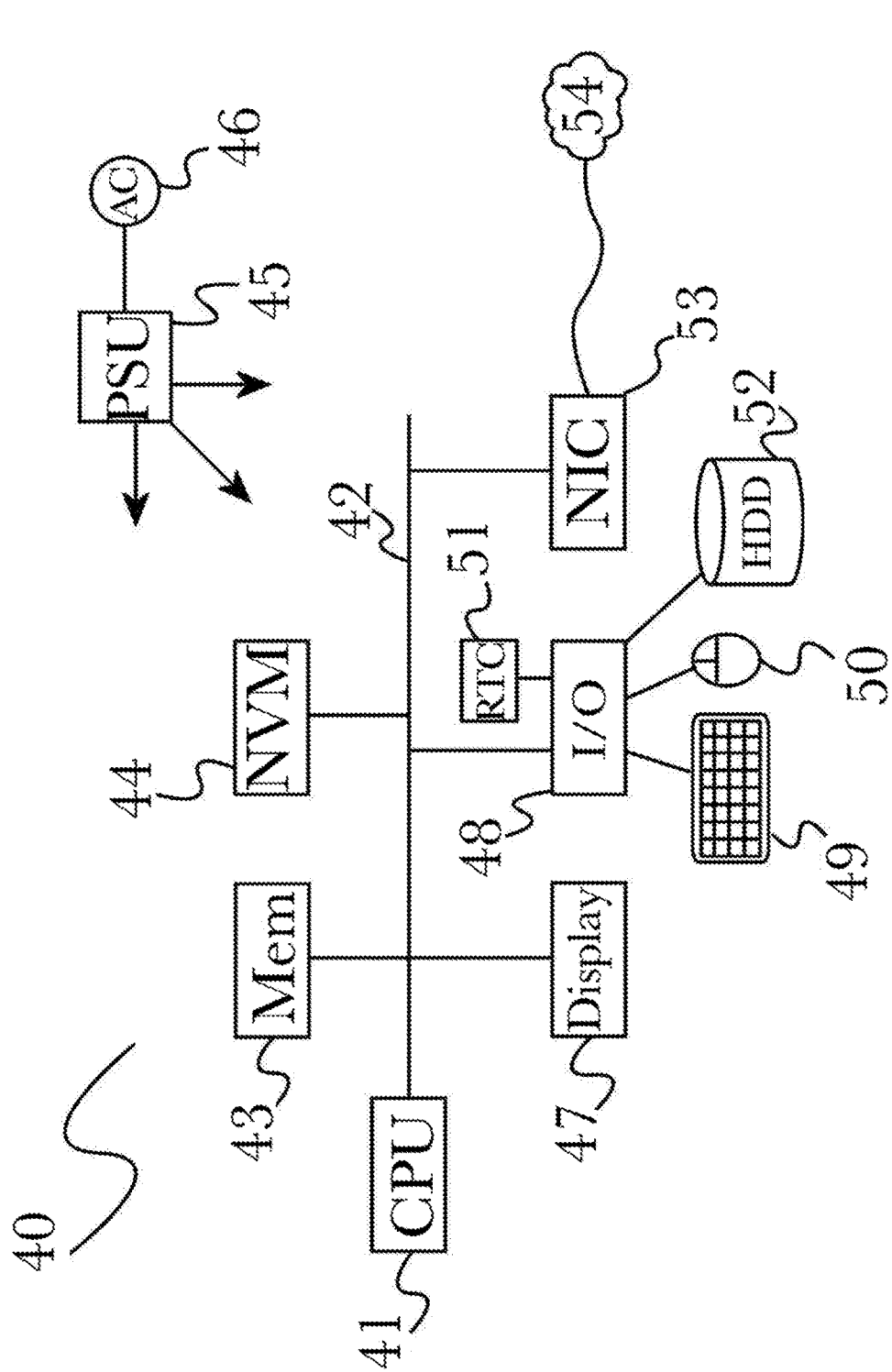
FIG. 4 is another block diagram illustrating an exemplary hardware architecture of a computing device used in various embodiments.

FIG. 4 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for automated telephony control system feature management across a plurality of user services, comprising:
    a telephony control system feature manager comprising at least a plurality of programming instructions stored in a memory and operating on a processor of a telephony control system and configured to:
    receive device event information from a first user device, and configured to compare at least a portion of the event information to a plurality of feature bundles, the feature bundles each corresponding to at least a plurality of feature configurations;
    direct the operation of the telephony control system by activating, modifying, or deactivating one or more user services related features of the a telephony control system, the user services related features corresponding to at least a second user device and the operation being directed based at least in part on the feature configurations; and
    retrieve from a mobile telephony control data store at least a plurality of programming instructions specifying new feature bundles based functionality to be employed upon capture of novel device event information sets; and
    the mobile telephony control data store comprising at least a plurality of programming instructions stored in a memory and operating on a processor of a network-connected computing device and configured to store and provide at least a plurality of feature configurations and a plurality of corresponding feature bundles, wherein each feature bundle corresponds to at least subset of the stored feature configurations controlling at least one user service.

2. The system of claim 1, wherein the mobile telephony control data store further stores and provides a plurality of feature policies, each policy corresponding to at least one feature bundle.

3. The system of claim 1, wherein at least one novel device event information set comprises at least one predefined gesture performed with the mobile computing telephony device.

4. The system of claim 3, wherein at least one novel device event is a hardware action from a set comprising at least turning the mobile computing telephony device face down on a surface.

5. The system of claim 3, wherein at least one novel device event is a software action from a set comprising at least the arrival of a specific time on a specific date.

6. The system of claim 3, wherein at least one novel device event is a degree of proximity threshold to at least one specific signal transmitter.

7. The system of claim 3, wherein at least one novel device event activates feature configurations to change the functional state of the user's mobile computing telephony device.

8. The system of claim 3, wherein at least one user subscribed service is acted upon to send an event corresponding to a policy affecting one or more feature bundles when the mobile computing telephony device completes at least one of a set of predefined gestures.

9. The system of claim 8, wherein at least one social media site is acted upon to display an announcement message when the mobile computing telephony device completes at least one of a set of predefined gestures.

10. The system of claim 3, wherein at least a portion of the predefined gestures performed with the mobile computing telephony device enable at least one feature policy on at least one second mobile computing telephony device changing the functional state of the second mobile computing telephony device target.

11. The system of claim 10, wherein the predefined gesture of turning her mobile computing telephony device face down on a surface by an assembly leader changes the functional state of all participant's mobile computing telephony devices to do not disturb.

12. The system of claim 1, wherein the mobile telephony control data store is supplied as a subscription remote service.

13. The system of claim 1, wherein at least one subscription remote service includes an interface to interact with a traditional landline telephony control service.

14. A method for automated telephony control system feature management, comprising the steps of:

receiving, at a telephony control system feature manager comprising at least a plurality of programming instructions stored in a memory and operating on a processor of a telephony control system, a plurality of device event information;

comparing at least a portion of the event information to at least a plurality of feature bundles stored in a database;

retrieving from a network-connected telephony control system data store data store at least a plurality of programming instructions specifying new feature bundle-based functionality to be employed upon capture of novel device event information sets;

creating at least one feature policy based upon at least one feature bundle; enacting, if a feature policy that matches the portion of the event information is found, a plurality of feature bundle directives based at least in part on the active feature configurations; and modifying the state of the telephony control system, based upon the performance of a predefined gesture with the mobile computing device, according to least one feature bundle directive retrieved from the network-connected telephony control system.

15. The method of claim 14, wherein operation continues iteratively over a plurality of feature bundles before terminating.

16. The method of claim 15, further comprising the step of determining whether a feature bundle is locked in a non-executable configuration state, and if so, skipping the bundle and continuing operation.

17. The method of claim 14, wherein at least one novel device event information set comprises at least one predefined gesture performed with the mobile computing telephony device.

18. The method of claim 14, wherein at least one user subscribed service is acted upon to send an event corresponding to a policy affecting one or more feature bundles when the mobile computing telephony device completes at least one of a set of predefined gestures.

19. The method of claim 14, wherein at least a portion of the predefined gestures performed with the mobile computing telephony device enables at least one feature policy on at least one second mobile computing telephony device changing the functional state of the at least one second mobile computing telephony target.

20. The method of claim 14, wherein at least one subscription remote service includes an interface to interact with traditional landline telephony control services.

* * * * *